INVENTORS
Jack R. Lythgoe
Charles G. Catherwood

United States Patent Office 3,460,935
Patented Aug. 12, 1969

3,460,935
METHOD OF OPERATION OF A PRESSURIZED
OPEN HEARTH FURNACE ROOF
Jack R. Lythgoe and Charles G. Catherwood, Johnstown,
Pa., assignors to Bethlehem Steel Corporation, a corporation of Delaware
Filed Feb. 12, 1968, Ser. No. 704,908
Int. Cl. C21c 5/32, 7/00; F27b 3/16
U.S. Cl. 75—60
7 Claims

ABSTRACT OF THE DISCLOSURE

A method of operating an open hearth furnace roof structure, including a refractory arch with a plurality of air passages etxending through the arch from the outer to inner surfaces, a hood mounted above the arch, and a fan in communication with the hood, which consists of continuously delivering to the hood a flow of air sufficient to maintain a positive pressure beneath the hood and cause a continuous flow of air through the arch passages. The flow of air to the hood and through the passages is increased during the melting and refining periods of a furnace heat as compared to the flow delivered at other times.

Related applications

Reference is made to Walton application Ser. No. 704,907, filed Feb. 12, 1968, concurrently with this application, also owned by assignee of the instant application, wherein a pressurized roof structure for a metallurgical furnace is disclosed.

Background of the invention

This invention relates to a pressurized roof structure for an open hearth furnace and more particularly to a method of operating such a roof structure.

The severe conditions of open hearth steelmaking operations have made the maintenance of such furnaces, particularly their roofs, a difficult problem. Recent improvements in these operations, especially the large scale use of oxygen, have further complicated the problems of maintaining such structures. The use of oxygen in the open hearth has raised operating temperatures and increased the amount of contaminants within such furnace chambers, factors which contribute to rapid roof deterioration. In addition, the periodic cooling of the furnace, which occurs during the tapping and charging periods, causes spalling of the roof bricks and accelerates roof failure.

Many attempts have been made to solve the aforementioned problems and increase the service life of open hearth roofs. In the past, when most such roofs were made of silica bricks, various means were tried to cool them. In one roof structure cooling air was forced through transverse passages in the roof and exhausted through openings in the top of the roof to the atmosphere. In another such structure the roof was enclosed by a hood into which pressurized air was passed to cool the top of the roof bricks. In the last decade open hearth roofs have been constructed of basic bricks which can withstand temperatures in excess of 3000° F. These bricks have been strengthened by encasing them in metal, and in some cases internal plates or wire mesh have been used to further reinforce the bricks to reduce spalling and increase their service life. In addition, furnaces have been rebuilt with their roofs raised above their original elevations. Despite these improvements and innovations, open hearth operators are still faced with problems of rapid roof deterioration. The pressurized roof structure described in the concurrently filed Walton application Ser. No. 704,907, Feb. 12, 1968, describes an improved open hearth roof construction in which the bricks are air cooled to prolong their life.

Summary of the invention

It is an object of this invention to provide a method of cooling an open hearth roof structure.

Another object of this invention is to provide a method of cooling an open hearth roof structure so as to prolong the life of its refractory arch.

Another object of this invention is to provide a method of cooling an open hearth roof structure so that the aforementioned spalling problem is materially reduced.

The method of this invention is accomplished in conjunction with an open hearth roof structure which has a refractory brick arch that has a plurality of passages extending from the outer to inner surfaces of the arch and which is covered by a sheet metal hood in communication with a blower that delivers air to the hood. The flow of air delivered to the hood is varied during the various periods of operation of a furnace heat. The amount of air delivered to the roof structure is sufficient, at all times, to maintain a positive pressure within the hood and a constant flow of air through the passages in the arch. During the melting and refining periods of a furnace heat the flow of air to the hood is increased relative to the flow of air delivered at other times.

Brief descripiton of the drawings

Description of the preferred embodiment

Figure 1:
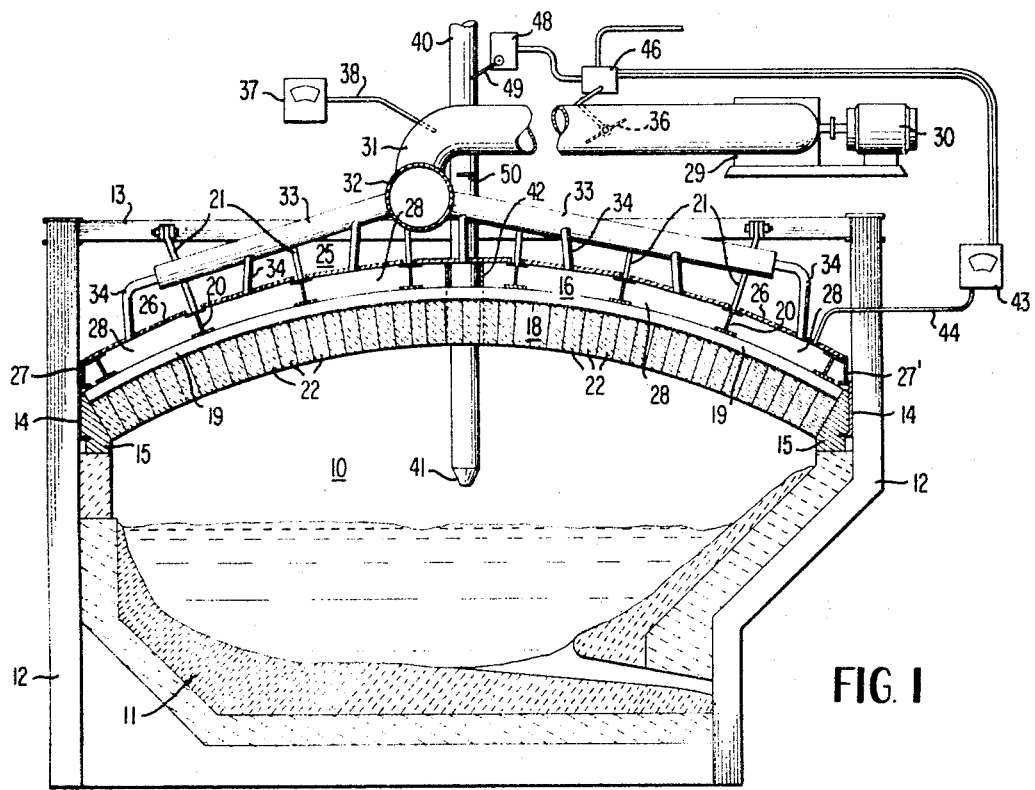
FIGURE 1 is a transverse sectional view of an open hearth furnace which is equipped with an air cooled roof structure.
Figure 2:
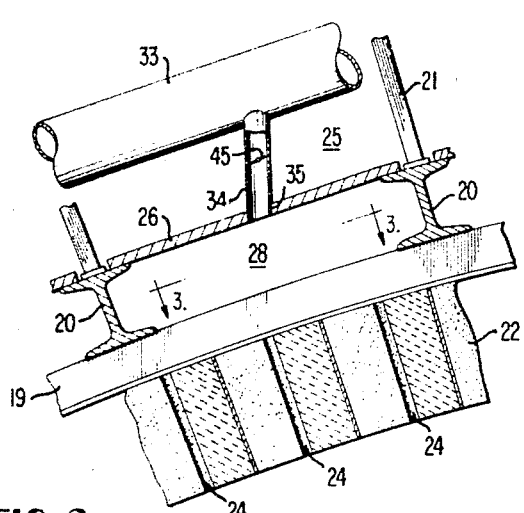
FIGURE 2 is an enlarged sectional view of a portion of the roof structure of FIGURE 1, taken on the line 2—2 of FIG. 3.
Figure 3:
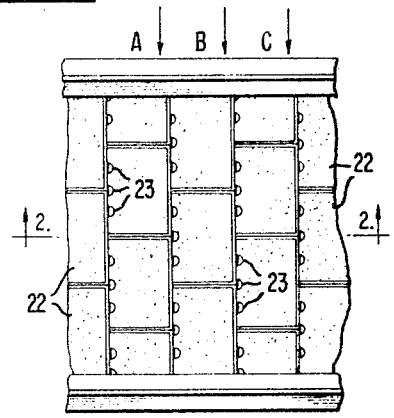
FIGURE 3 is a fragmental plan view looking down on top of the roof brick from the points 3—3 as shown in FIGURE 2.

Referring to the drawings there is shown in FIGURE 1 an open hearth furnace 10 having a hearth 11 and buckstays 12 at the front and back of the furnace, connected at their tops by cross channels 13, which extend transversely of the furnace. Skewback channels 14, which are connected to buckstays 12, extend longitudinally of the furnace and support skewbrick 15. Extending both longitudinally of the furnace and transversely of the furnace between skewbricks 15 is roof structure 16.

Roof structure 16 includes arch 18 which is restrained by contour control bars 19 that extend transversely of the furnace. Resting upon bars 19 and reinforcing them are beams 20 which extend longitudinally of the furnace for the full length of the arch. Hold-down jacks 21 extend radially of the arch and extend from the tops of beams 20 to cross channels 13. Arch 18 is formed of bricks 22 arranged in rows, marked A, B and C in FIG- URE 3, which extend longitudinally of the furnace with overlapping transverse joints, i.e. bonded construction. Each brick 22 has one or more notches or grooves 23 which extend for the full height of the brick, from top to bottom, and each of which defines with an adjoining brick, a passage 24 through the arch from top to bottom. Extending over arch 18 is cover or hood 25 which can be made of sheet metal or other suitable material. Hood 25 may be of any desired construction and, as illustrated, is composed of top panels 26, front panel 27 and back panel 27', and end panels, which are not specifically identified. Top panels 26 extend for the full length of the arch between the tops of adjacent beams 20. Front panel 27 and back panel 27' extend for the length of the arch between the tops of outside beams 20, at the front and back of the arch, and their adjacent skewback channels 14. End panels, not shown, at both ends of the arch, extend between top panels 26 and front and back panels 27 and 27' respectively, to the tops of the arch bricks to complete the closing of the hood, thereby forming air space 28 between hood 25 and arch 18.

Air is supplied to hood 25 by fan 29 operated by motor 30 connected to a source of power, not shown. Fan 29 is connected to the hood through main 31 which extends from the fan to a location above the furnace steelwork where it connects with a header main 32, which extends longitudinally of arch 18, above hood 25. Leading from both sides of header main 32, at spaced intervals above the hood, are branch ducts 33. Feeder pipes 34 extend downwardly from the branch ducts 33 and connect with openings 35 in top panels 26. Each feeder pipe 34 is provided with flow control valve 45 to regulate the flow of air through the pipe. Branch ducts 33 and feeder pipes 34 are arranged to provide a substantially uniform distribution of air to space 28 beneath hood 25. The amount of air delivered by fan 29 to air space 28 is regulated by butterfly valve 36 in main 31, and flow meter 37 connected to header main 32 by means of tube 38 measures the flow of air through the main.

The usual manner of open hearth operation may be divided into several stages or periods, i.e. charging period, meltdown period, working or refining period, tapping and pouring period, and furnace preparation period. In the usual practice hot metal is added to the furnace about midway during the meltdown period. Today, in many open hearth furnaces oxygen is used to accelerate the refining process and reduce the time required to complete a heat. Oxygen is directed into the molten metal by means of lances which are lowered into the furnace toward the end of the meltdown period, after hot metal has been charged. The flow of oxygen is stopped and the lances withdrawn from the furnace at the end of the refining period. In some oxygen open hearth furnaces all of the iron bearing materials, including both scrap and hot metal, are placed in the furnace during the initial charging period. Thereafter, the lances are lowered and oxygen directed against the bath in much the same manner as the operation of a basic oxygen furnace, i.e. oxygen converter. In FIG. 1, furnace 10 is shown with oxygen lance 40 lowered into blowing position with its nozzle 41 projecting beneath arch 18. Lance 40 passes through collar 42 in hood 25 and through an opening, not shown, in arch 18.

In the operating method of this invention the flow of air from fan 29 to hood 25 is varied during furnace operation. During the charging period, the meltdown period, until the addition of hot metal, the tapping and pouring period, and furnace preparation period the flow of air is kept at a minimum amount sufficient to maintain within hood 25 a pressure higher than that within the furnace so that there is a continuous flow of air through arch passages 24. The pressure in air space 28 beneath hood 25 is continuously measured by gage 43 which is connected with the hood by means of tubing 44. Gage 43 is interconnected with valve motor 46 which further opens valve 36 when the pressure in air space 28 reaches a predetermined minimum and partially closes valve 36 when the pressure in air space 28 reaches a predetermined maximum, in a manner well known to those skilled in the art. After the addition of hot metal is made to hearth 11, valve 36 is opened and the flow of air to hood 25 is increased. For the purposes of describing the operating method of this invention the refining period is considered to be the period between the completion of hot metal addition and tapping. The flow of air to hood 25 is increased for at least a portion of the refining period, preferably the flow rate during this period is at least approximately two and one-half times the flow rate during the other periods of operation. The upper limit to the amount of air which can effectively be delivered to the hood during the refining period is obviously an amount less than that which would interfere with normal operating conditions. In oxygen open hearth furnaces the time during which there is maximum air flow to the hood coincides with the time during which the lances are lowered and oxygen is directed against the bath. While valve 36 can be controlled manually from furnace panel board, not shown, valve motor 46 can be interconnected with limit switch 48 having arm 49 which is controlled by stop 50 on lance 40. When lance 40 is lowered stop 50 moves switch arm 49 to its lower position thereby actuating motor 46 to open valve 36 and permit the maximum amount of air to flow to hood 25. When lance 40 is raised the action is reversed and valve 36 is moved to the position which allows the minimum amount of air to flow to the hood.

In an open hearth furnace having an air cooled roof structure to which air was delivered by the method of this invention, the roof had an area of about 720 square feet and was constructed in the form of a sprung arch with approximately 7500 bricks, each having three longitudinally extending grooves of ¼" radius, which provided total roof passage openings of approximately 2200 square inches. The maximum air flow to the hood during the refining period when the lances were down and oxygen was being blown was approximately 500,000 cu. ft. per hour, or approximately 225 cu. ft. of air per hour per sq. in. of roof opening. During the remainder of the furnace operating periods the air flow to the roof was a minimum of approximately 100,000 cu. ft. per hour, or approximately 45 cu. ft. of air per hour per sq. in. of roof opening. Based on roof area, the maximum air flow was approximately 680 cu. ft. per hour per sq. ft. of roof area, while the minimum air flow was approximately 140 cu. ft. per hour per sq. ft. of roof area. The combustion air delivered to the furnace was approximately 650,000 cu. ft. per hour and the pressure in air space 28 beneath hood 25 was approximately 1" of water at maximum air flow to the hood.

We claim:
1. A method of operating an open hearth furnace having a roof assembly of the type comprising a refractory arch having a plurality of passages extending from the outer surface to the inner surface thereof, each such passage having an opening in the outer and inner surfaces of said arch, a hood above said arch and defining therewith a fluid chamber, and fan means in communication with said hood, to improve the life of said refractory arch during furnace operations extending through a plurality of heats, each said heat comprising a charging period, a refining period, and a tapping period, said method comprising the steps of:

(a) delivering to said chamber a flow of fluid sufficient to maintain a pressure therein higher than the pressure within said furnace and to cause a flow of said fluid through said arch passages into said furnace,
(b) increasing the flow of fluid delivered to said chamber and through said arch passages during at least a portion of said refining period.

2. The method of claim 1 wherein said fluid is delivered to said hood and caused to continuously flow through said arch passages and into said furnace for substantially a major portion of each heat.

3. The method of claim 2 wherein the increased flow of fluid delivered in step (b) is for substantially a major portion of the refining period of each heat.

4. The method of claim 1 wherein an oxygen lance is lowered through said refractory arch and oxygen blown into said furnace during at least a portion of said refining period.

5. The method of claim 1 wherein the flow of fluid delivered to said hood and caused to flow through said arch passages and into said furnace in step (b) is at least two and one-half times the flow of fluid delivered thereto in step (a).

6. The method of claim 1 wherein there is delivered to said chamber during step (a) at least approximately 45 cu. ft. of fluid per hour per square inch of arch passage opening.

7. The method of claim 1 wherein there is delivered to said chamber during step (a) at least approximately 140 cu. ft. of fluid per hour per square foot of arch area.

References Cited
UNITED STATES PATENTS

| | | | |
|---|---|---|---|
| 2,039,087 | 4/1936 | Kinzel | 263—52 |
| 2,217,384 | 10/1940 | Rodenbaugh | 263—44 |
| 2,293,332 | 8/1942 | Dow et al. | 263—44 |
| 3,113,765 | 12/1963 | McGough | 263—52 X |

JOHN J. CAMDY, Primary Examiner

U.S. Cl. X.R.

75—43; 263—44, 52; 266—34